July 3, 1934. M. HARD Re. 19,229

EXHAUST STEAM INJECTOR

Original Filed Dec. 5, 1928 4 Sheets-Sheet 1

Malcolm Hard INVENTOR.

BY O. V. Thiele

ATTORNEY.

July 3, 1934. M. HARD Re. 19,229

EXHAUST STEAM INJECTOR

Original Filed Dec. 5, 1928 4 Sheets-Sheet 2

Malcolm Hard INVENTOR.

BY

O. V. Thiele

ATTORNEY.

July 3, 1934. M. HARD Re. 19,229

EXHAUST STEAM INJECTOR

Original Filed Dec. 5, 1928 4 Sheets-Sheet 3

Malcolm Hard INVENTOR.

BY O. V. Thiele

ATTORNEY.

EXHAUST STEAM INJECTOR

Original Filed Dec. 5, 1928 4 Sheets-Sheet 4

INVENTOR.
Malcolm Hard.
BY
O. V. Thiele
ATTORNEY.

Reissued July 3, 1934 Re. 19,229

UNITED STATES PATENT OFFICE 19,229

EXHAUST STEAM INJECTOR

Malcolm Hard, Hammond, Ind., assignor to The Superheater Company, New York, N. Y.

Original No. 1,870,006, dated August 2, 1932, Serial No. 323,852, December 5, 1928. Application for reissue March 21, 1933, Serial No. 661,933

25 Claims. (Cl. 103—265)

My invention relates to exhaust steam injectors of the type intended to be operated primarily by exhaust steam from an engine and provided with means whereby the injector may be operated by live steam when exhaust steam is not available.

It is desirable to provide control systems for injectors of this type whereby the injector may be shifted automatically from exhaust steam operation to live steam operation, or vice versa, and in the first control systems of this character developed the shifting of the injector has been governed by the presence or absence of live steam in the main supply pipe leading to the engine cylinders. The steam pressure in this main steam supply line is indicative of engine exhaust steam conditions, but more satisfactory operation of the injector can be secured if its shifting is governed by the exhaust steam itself.

Means for controlling the shifting or change-over of the injector from exhaust steam to live steam operation, or vice versa, are disclosed in my prior U. S. Patent No. 1,573,059 granted to me February 16, 1926 and the present invention is in the nature of an improvement upon the apparatus shown in said patent. Injectors of the character under consideration must, to be commercially successful, be applicable to locomotive engines operated under widely varying conditions, resulting in the production of engine exhausts which are pulsating in character and which may vary from about atmospheric pressure to pressure exceeding thirty pounds per square inch. The forms of exhaust steam control change-over mechanism heretofore developed have proved difficult to operate satisfactorily under certain of the extreme conditions encountered in locomotive service, and the principal object of the present invention is the provision of a change-over mechanism of this character capable of successful commercial operation under all conditions encountered in locomotive service. Further and more detailed objects of the invention comprise the several novel combinations of elements and applications of principles through the medium of which the principal object of the invention is attained.

Figure 1A:
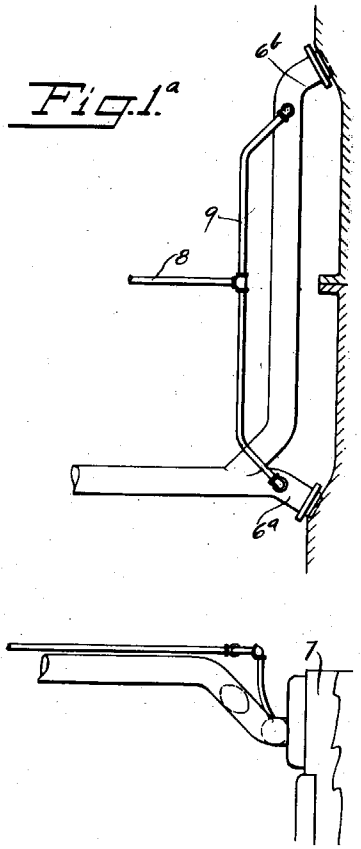
Figure 1:
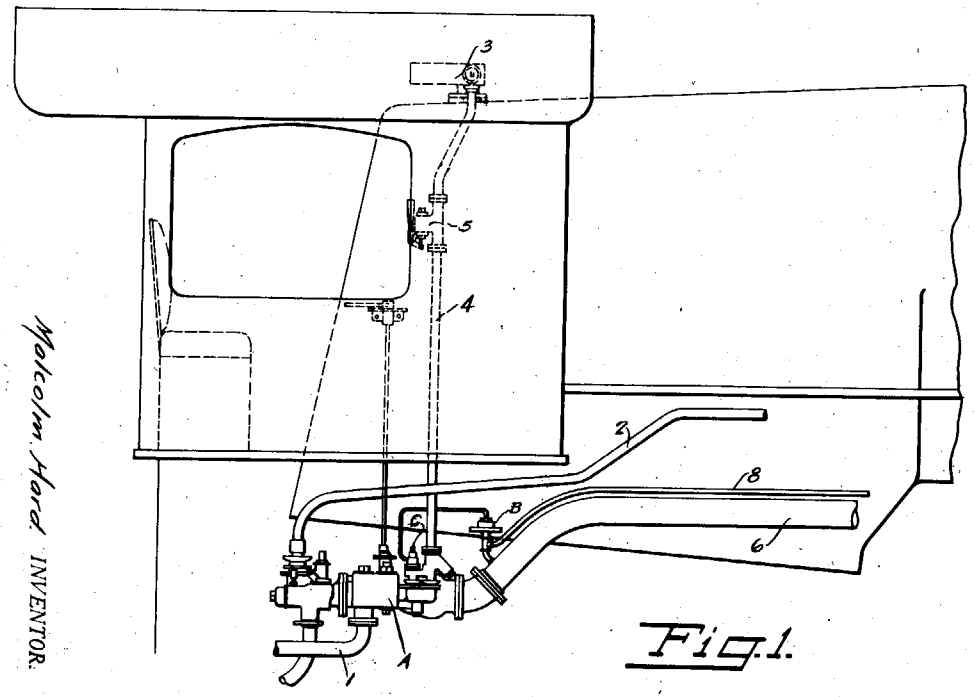
Figures 2, 4, 5:
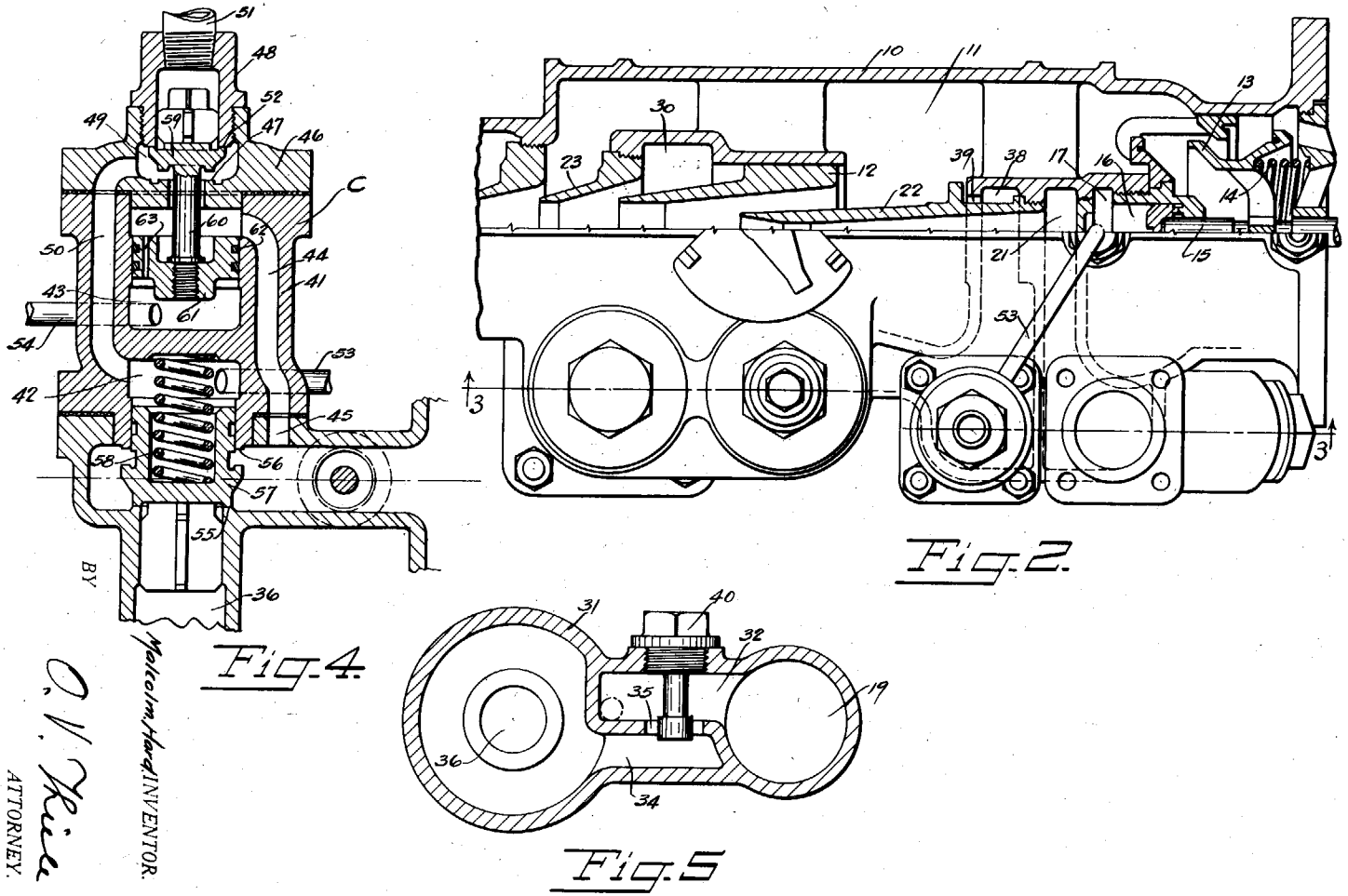
Figure 3:
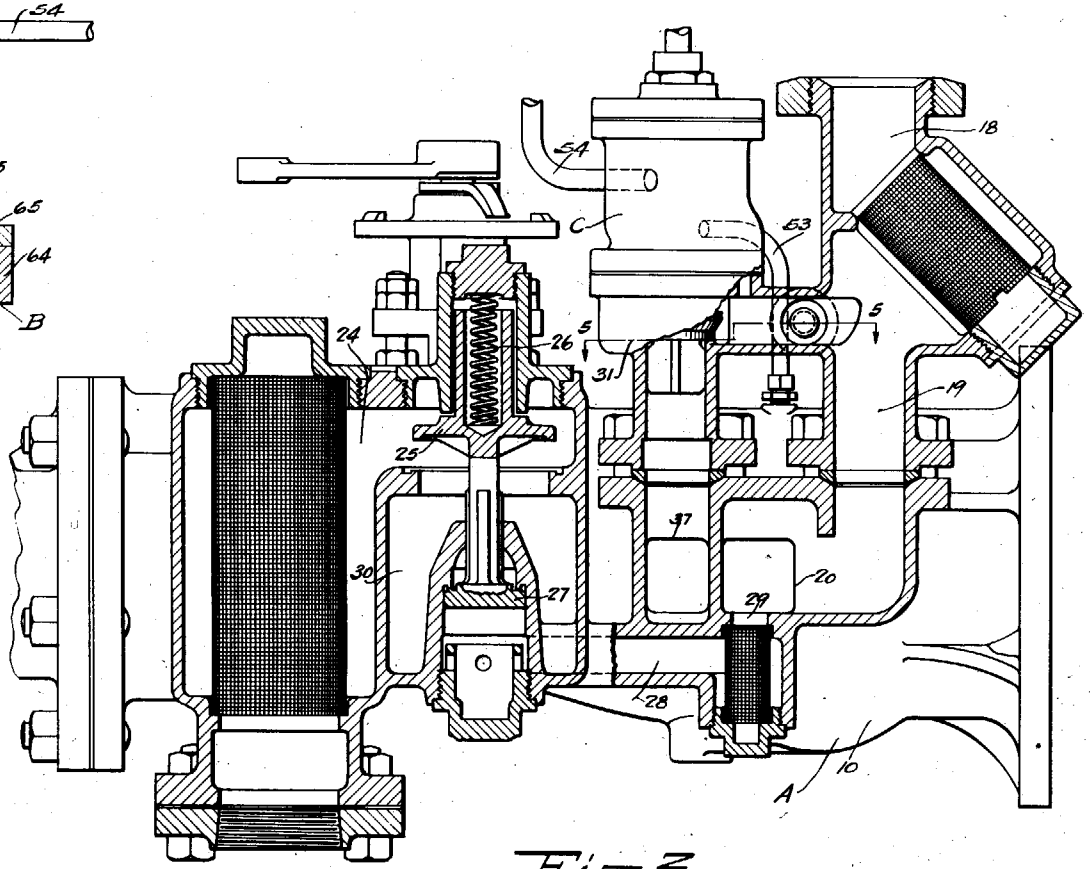
Figure 3A:
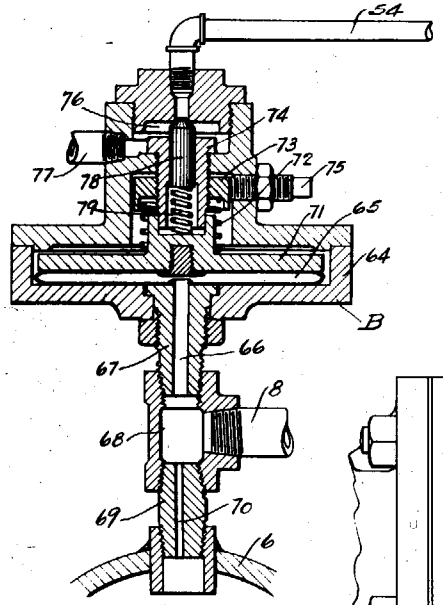
Figure 6:
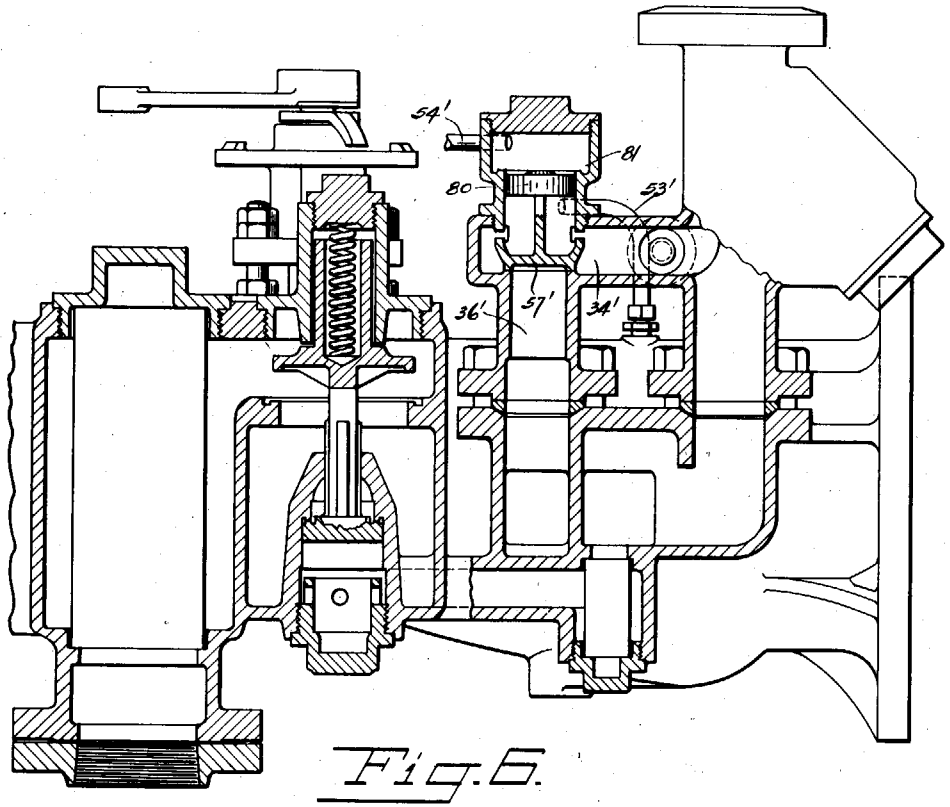
Figure 7:
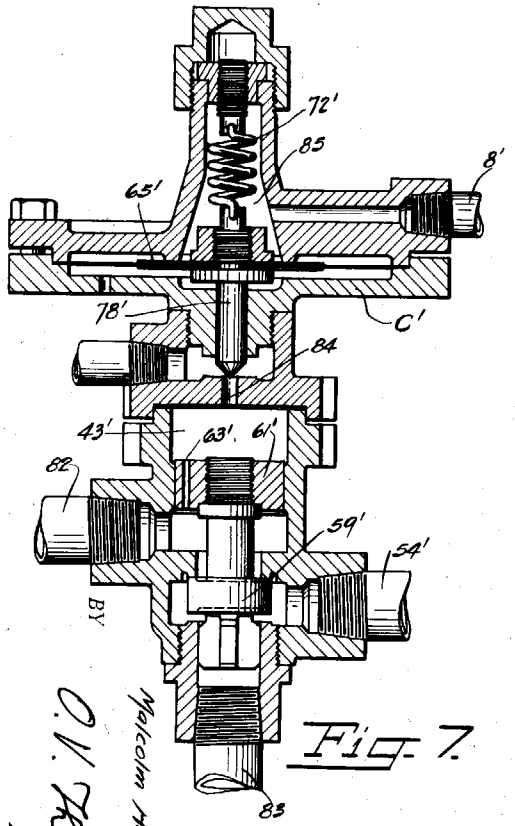

The invention may best be understood from a consideration of the ensuing description of preferred forms of apparatus for carrying it into effect and by reference to the accompanying drawings forming a part hereof, in which Fig. 1 is a diagrammatic elevation of a locomotive having applied thereto an injector embodying the invention; Fig. 1*a* is a plan view of a portion of Fig. 1; Fig. 2 is a plan view partly in section and on an enlarged scale of a portion of the injector; Fig. 3 is a section taken on the line 3—3 of Fig. 2; Fig. 3*a* is an enlarged vertical section of the exhaust steam operated control mechanism; Fig. 4 is an enlarged section of a portion of the apparatus shown in Fig. 3; Fig. 5 is a section taken on the line 5—5 of Fig. 3; Fig. 6 is a view similar to Fig. 3, showing a modified form of change-over valve, and Fig. 7 is a vertical section of a modified form of exhaust steam operated control mechanism.

Referring now to Figs. 1 and 1*a*, A indicates the injector which is supplied with water through the conduit 1 and which delivers water through conduit 2 to the boiler check valve (not shown). Live steam for controlling and operating the injector is taken from the boiler turret 3 by means of supply pipe 4, in which is located the main control valve 5 situated in the cab of the locomotive. Exhaust steam for operating the injector is supplied through the exhaust pipe 6, which receives steam through the branches 6*a* and 6*b*, the latter communicating with the exhaust passages of the engine cylinders 7 at opposite sides of the locomotive. Steam taken from the exhaust pipe at a point adjacent to the cylinder exhaust port is carried back to a diaphragm valve mechanism B (which will be described in detail later) through the conduit 8, which is joined by means of a T to the cross-connection 9, the ends of which communicate with the branch exhaust steam supply pipes 6*a* and 6*b* near the inlet ends of the latter.

Turning now to Figs. 2 and 3, the injector shown is of a well-known form, comprising a main casing 10 forming a steam chamber 11, which delivers low pressure steam to the main steam nozzle 12. Exhaust steam is delivered to chamber 11 through the exhaust pipe 6, and the flow thereof is controlled by means of the exhaust valve 13 which is normally closed by spring 14 and which is opened by means of the exhaust valve piston 15 operating in the cylinder 16, the latter being placed in communication with the exterior of the injector at the top thereof by means of the vertical passage 17.

High pressure live steam from supply pipe 4 enters the passage 18 and a portion of this live steam, hereinafter referred to as "supplementary" steam, passes through the branch passage 19 and port 20 to the steam chamber 21, which supplies the high pressure supplementary steam nozzle 22. The combined jets from nozzles 12 and 22 mingles with water supplied through the cone 23 and the steam and water mixture passes from this cone to the usual combining and delivery nozzles (not shown).

Water supplied to the injector through conduit 1 enters the passage 24, the outlet from which is controlled by the water valve 25. The water valve is normally closed by spring 26 and is opened when high pressure steam is admitted to the injector by the action of a portion of said steam on the piston 27, which is connected by way of passage 28 and port 29 with the passage 19. When valve 25 is open, water flows to the chamber 30, from which it is delivered to the cone 23.

The casing 31 forming passages 18 and 19 also forms passage 32 communicating with passage 19 and with passage 34 by way of port 35. Passage 34 in turn communicates by way of passage 36 and port 37 with the steam chamber 38 in the injector and the latter chamber communicates with the main low pressure steam chamber 11 of the injector by way of ports 39. A removable plug 40 extending through passage 32 determines the free area through port 35, which may be varied by using plugs having heads of different diameters. The passages thus described serve to furnish to the injector steam at reduced pressure to take the place of exhaust steam when the latter is not available, this live steam of reduced pressure being hereinafter referred to as "auxiliary" steam. Reduction in the pressure of the live steam to that desired for auxiliary steam is accomplished by the throttling action of the restricted port 35, commonly known as the auxiliary steam choke.

Control of the flow of auxiliary steam to the injector and also of the opening of the exhaust valve is secured by means of the automatic valve mechanism C (Fig. 4) the actuation of which is in turn governed by the exhaust steam governed diaphragm valve mechanism B.

The automatic or change-over valve mechanism C comprises a housing 41 adapted to be secured over an opening in the casing 31 above steam passage 36. Housing 41 forms a downwardly opening cylinder 42 in alignment with steam passage 36 and an aligned upwardly opening cylinder 43. It also is provided with a steam passage 44 placing the upper end of cylinder 43 in communication with passage 32 in casing 31 by way of port 45 in said casing. A cap 46 provides a ported closure for the upper end of cylinder 43, there being a valve seat 47 surrounding the port in the casing cap, which forms, with the annular closing plug 48, a steam chamber 49 connected by means of passage 50 with the upper end of cylinder 42. Chamber 49 is placed in communication with the atmosphere, or other area of low pressure, such as chamber 11 of the injector, by way of the plug 48 and pipe 51, there being a valve face 52 surrounding the opening leading to pipe 51. Pipe 53 connects the upper end of cylinder 42 with the exhaust valve control passage 17 in the injector and pipe 54 leads from the lower end of cylinder 43 to the exhaust steam controlled diaphragm mechanism B.

An annular seat 55 surrounds the upper end of steam passage 36 and a similar valve seat 56, larger in diameter, is formed around the lower end of cylinder 42. Between these two seats is mounted the valve member 57 provided with a lower double faced valve head and the upper portion of which is in the form of a piston slidably mounted in cylinder 42. A spring 58 between valve member 57 and the top of cylinder 42 serves to urge the valve to its lower seat to close passage 36. In some instances this spring, the purpose of which will appear later, may be omitted.

A double seated valve 59, hereinafter referred to as the relay valve, is mounted in chamber 49 between valve seats 47 and 52 and is connected by means of stem 60, which passes through the port in cap 48 with considerable clearance, to piston 61 mounted in cylinder 43. Piston 61 is preferably provided with packing rings 62 and has bored therethrough a small passage 63 of predetermined area.

The exhaust steam governed mechanism "B" shown in Fig. 3a comprises a housing 64 forming a chamber in which is located the flexible diaphragm 65. This diaphragm is of the chamber type and is placed in communication with the pipe 8 leading from the exhaust pipe by means of the passage 66 formed in the connection 67, which is screwed into the T 68. A vertical nipple, or thimble, 69, having a small bore 70 therethrough, connects the interior of T 68 with the main exhaust pipe 6, the purpose of this connection being to permit condensate forming within the diaphragm 65, or carried over into pipe 8, to drain to the main exhaust pipe. The plate 71, mounted on the diaphragm 65, acts as a stop to prevent over-expansion of the latter in case abnormally high pressures reach the interior of the diaphragm. An adjustable downward pressure on the plate 71 is obtained by means of the spring 72 held between the plate and the locking ring 73, the latter being threaded upon the plug 74 and adapted to be in turn held in position by the locking pin 75. A chamber 76 in the top of the housing is vented to the atmosphere through pipe 77, and the admission of steam to this chamber from pipe 54 is controlled by the needle valve 78 slidably mounted in the plug 74. In the form illustrated, a spring 79 is shown interposed between the pin 78 and the plate 71, but these two elements may be rigidly connected in some instances, as will be explained more fully hereinafter.

The operation of the apparatus just described is as follows: Assume it is desired to start the injector when exhaust steam from the engine is not available. Upon opening the main control valve 5, live steam under boiler pressure is admitted through the conduit 4 and passage 18 to the branch connection 19, from which it flows through port 20 to chamber 21 and to the supplementary steam nozzle 22. At the same time high pressure steam passes through passage 28 lifting water valve piston 27 and valve 25 to the position shown in Fig. 3, thereby admitting water to chamber 30 and the water cone 23 to prime the injector. Steam also flows from the passage 32 through passage 44 to the cylinder 43 above piston 61, thereby forcing relay valve 59 to its lower seat 47 and closing communication between passage 44 and cylinder 42. Steam leaks through passage 63 to the lower portion of cylinder 43, but pressure is prevented from building up in the latter because of the fact that pipe 54 is vented to the atmosphere or some other point of low pressure by pipe 77, these two pipes being in communication, because of the fact that due to the absence of exhaust steam pressure acting on diaphragm 65, the valve 78 is off its seat. Due to the failure of high pressure steam to reach the upper end of cylinder 42 because of the action of the relay valve 59, steam flowing from passage 32 by way of the choke port 35 to passage 34 acts to lift the automatic valve 57 from its lower seat against the action of spring 58. This lifting of valve 57 is accomplished due to the fact that the piston forming the upper end of the valve member is slightly larger in diameter than the lower valve face of the valve. Spring 58 is used merely to delay the admission of auxiliary steam to the injector through passage 36 until after the injector has had an opportunity to be primed by the admission of water and supplementary steam. Theoretically, this delay is not necessary but as a matter of practice, factors such as a leaky control valve permitting steam to reach the injector and warm it during periods of inaction, and also extremely warm suction water, make the injector difficult to start if water, supplementary and auxiliary steam are admitted simultaneously. It will therefore be seen that in some instances, such for example, where extremely cold suction water is available, this spring may be omitted.

Similarly, when the injector is started on exhaust steam, priming by admitting water and supplementary steam ahead of the exhaust steam may be accomplished by using a relatively strong spring 14 on the exhaust valve which will act to keep the exhaust valve closed until after the water valve, held to its seat by a weaker spring, has been opened.

If, with the injector running on live steam, the engine is started so that exhaust steam becomes available, the action is as follows:

Exhaust steam pressure building up in diaphragm 65 acts through valve 78 to close the atmospheric vent for pipe 54 and consequently pressure builds up in the lower end of cylinder 43 to balance piston 61. With the latter balanced, the relay valve 59 is lifted to the position shown in Fig. 4 by pressure of steam in passage 44 and steam flows from this passage through passage 50 to the upper end of cylinder 42. Because of the throttling action of the choke port 35, steam passing to passage 36 when valve 57 is in its upper position is at a materially reduced pressure, so that the high pressure steam entering cylinder 42 is enabled to shift valve 57 against this lower steam pressure to the position shown in Fig. 4. This action serves to cut off the supply of auxiliary steam to the injector and at the same time high pressure steam from the upper end of cylinder 42 passes by way of pipe 53 to the exhaust valve operating piston 15, which acts to open the exhaust valve and admits the exhaust steam to the injector.

Upon a failure of the exhaust steam supply while the injector is running, pressure in the lower end of cylinder 43 is released and the unbalanced pressure on piston 61 serves to shift the relay valve 59 to its lower seat, thereby venting the upper end of cylinder 42 to the atmosphere by way of pipe 51. This action permits the automatic valve 57 to be shifted to its upper seat by steam from passage 34 and also by relieving the pressure in pipe 53 to the atmosphere permits spring 14 to close the exhaust valve.

The major difficulty in utilizing the exhaust steam as the medium governing the shifting of the injector from live to exhaust steam operation and vice versa is because of the pulsating character of the engine exhaust which has, in the earlier systems developed, caused the injector to shift operation at times when such shift was not desired. By my present invention, I have overcome the difficulty heretofore encountered and have provided a means whereby exhaust steam may be used as the governing medium, even though a relatively stable exhaust pressure is not available. Two major factors contribute to this improved result, the first being the arrangement of piping leading from the engine exhaust passages to the diaphragm valve, which acts to reduce the degree of exhaust steam pulsation. Referring to Fig. 1*a*, it will be noted that exhaust steam is taken from two branches, one of which leads from each of the engine cylinders. Exhaust steam is admitted alternately to the two branches, 6*a* and 6*b* of the engine exhaust pipe, and consequently is admitted alternately to the two branches of the crosspipe 9, producing within this pipe a reversing or alternating flow. This flow is at right-angles to the inlet end of pipe 8, which therefore does not receive any of the kinetic energy from the steam pulsations occurring in the branches of pipe 9. The pressure transmitted through pipe 8 is therefore in the nature of an average of the static pressures existing in pipe 9, but experience has shown that even this pressure is not stable under some engine operating conditions, such as full throttle at low speed with maximum cut-off.

The pulsating character of the steam acting on the diaphragm 65 is, however, substantially eliminated insofar as its action on the shifting of the injector is concerned, because of the manner in which the pressure in chamber 43 which governs the position of the relay valve is controlled by the diaphragm valve. To illustrate, assume that with the injector running on live steam, the engine is started under conditions giving a slowly pulsating exhaust producing wide variations in pressure. The injector should not be shifted to exhaust steam operation as soon as the first exhaust steam, in puffs separated by distinct time intervals, is available, as under these conditions the lack of continuity of the exhaust steam supply might cause the injector to spill. Assuming that the first pulse of exhaust steam is of sufficient intensity to close valve 78, the operation of the injector will not be immediately affected. This is due to the fact that valve 78 must remain closed or nearly closed long enough to permit pressure to be built up in the lower end of cylinder 43 before piston 61 can be balanced and the operation of the injector shifted because of the consequent shifting in position of valves 59 and 57. A pulsating exhaust, unsuitable for injector operation, will not maintain valve 78 on or close to its seat steadily enough to permit pressure to be built up in cylinder 43, and the shifting action caused by a rise in pressure in this cylinder will not be effected until the exhaust pressure has become sufficiently high and stable to satisfactorily operate the injector. It will thus be seen that the operation of valve 78 in governing the pressure acting on piston 61 acts, in effect, to absorb the pulsations in exhaust pressure which are transmitted through pipe 8 to the diaphragm 65 and to prevent the transmission of these pulsations to piston 61.

It will further be noted that with the construction employed it is not necessary that valve 78 seat tightly in order to cause valve 59 to be shifted, for if valve 78 is continuously held close to its seat so that the area of the vent to atmosphere is less than the area of passage 63, pressure will gradually be built up in cylinder 43 and valve 59 shifted. This feature is useful in cases where the valve 78 is rigidly connected to the diaphragm as the apparatus may then be designed so that valve 78 does not seat at any time, thereby preventing wear due to pounding of the valve on its seat. Wear of this character can also be avoided by providing a resilient connection between the valve and the diaphragm, as illustrated by the spring 79 shown in Fig. 3*a*. Obviously if a spring such as 79 is used, its strength must be sufficient to prevent valve 78 from being opened because of steam pressure in pipe 54 acting on the head of the valve.

In Figs. 6 and 7 a modified form of construction is shown which, however, employs the same principles utilized in the form already described. In the form of apparatus shown in these figures, the general construction of the injector is the same as that shown in Figs. 2 and 3, with an automatic change-over valve 57′, having a double seated head, controlling steam flow from the passage 34′ in alternation to the auxiliary steam passage 36′ and the exahust steam control pipe 53′. Valve 57′ has formed therewith a controlling piston 80, and the position of the valve is determined by the presence or absence of pressure in chamber 81 above piston 80. Chamber 81 is connected to the exhaust steam pressure governed mechanism C′ by means of pipe 54′, this pipe being connected either with a source of high pressure steam admitted through pipe 82 or to the atmosphere through pipe 83 by the action of the double seated relay valve 59′, to which is attached piston 61′ operating in cylinder 43′ and provided with a leak passage 63′. The upper end of cylinder 43′ is vented to the atmosphere by way of port 84 controlled by the needle valve 78′, the latter being mounted on diaphragm 65′. Pipe 8′ carries exhaust steam to a closed chamber 85 above diaphragm 65′, and an adjustable spring 72′ serves to normally hold valve 78′ in its open position.

The operation of this form of the invention will be largely obvious, as it is substantially the same as has hereinbefore been described. The presence or absence of exhaust steam admitted through pipe 8′ determines the position of valve 78′ which in turn governs the pressure in cylinder 43′. If pressure is allowed to accumulate in this cylinder, piston 61′ will be balanced and valve 59′ will be shifted to the position opposite that shown in Fig. 7. This action permits high pressure steam flow from pipe 82 through pipe 54′ to the upper side of piston 80, shifting valve 57′ to its lower seat, as shown in Fig. 6, thereby allowing steam from passage 34 to pass to the exhaust steam valve control pipe 53′. Release of pressure in cylinder 43′ due to failure of the exhaust steam pressure in pipe 8′ causes valve 59′ to shift to the position shown in Fig. 7, venting chamber 81 to atmosphere and permitting steam pressure from passage 34′ to lift valve 57′ and admit auxiliary steam through passage 36′. With the valve 57′ shifted to its upper position, the admission of steam to pipe 53′ is cut off and this pipe is vented to atmosphere by way of pipe 54′, due to the fact that piston 80 is a loose fit in its cylinder.

From the modifications herein-before described, it will be apparent to those skilled in the art that many changes may be made in the mechanical details of construction without departing from the invention, which is to be considered as embracing all such modifications and equivalents as may be included within the scope of the appended claims.

I claim:

1. In a control system for an exhaust steam injector of the type adapted to be operated by live steam when exhaust steam is not available, a valve for controlling the admission of a live steam supply to the injector, a connection providing a path for flow of pressure fluid from a zone of relatively high pressure to a zone of relatively low pressure, means responsive to variations of pressure in said connection for controlling the position of said valve, and means acting to effect closure of said valve to shift the injector from live steam operation comprising means for altering the rate of flow of pressure fluid through said connection so as to change the value of the pressure therein.

2. In a control system for an exhaust steam injector of the type adapted to be operated by live steam when exhaust steam is not available, a valve for controlling the admission of a live steam supply to the injector, a connection providing a path for flow of pressure fluid from a zone of relatively high pressure to a zone of relatively low pressure, means responsive to a rise of pressure in said connection to close said valve, and means acting to effect closure of said valve to shift the injector from live steam operation comprising a valve operable to cause increase in pressure in said connection by restricting the rate of flow of pressure fluid therefrom.

3. In an exhaust steam injector control system, a pressure chamber, means for continuously admitting steam to said chamber at a predetermined rate, means for venting said chamber, means responsive to exhaust steam pressure for controlling flow through said venting means, and a valve actuated by pressure variations in said chamber for controlling the admission of a live steam supply to the injector.

4. In an exhaust steam injector of the type adapted to be operated by live steam when exhaust steam is not available, a conduit for supplying auxiliary steam to said injector, an automatic valve for controlling steam flow through said conduit, a conduit for admitting high pressure steam to one side of said automatic valve to seat it, a relay valve located in said conduit, a pressure chamber, a channel for providing constant communication between said pressure chamber and a source of steam, means for venting said pressure chamber, means responsive to exhaust steam pressure for controlling flow through said venting means, and means associated with said relay valve and responsive to pressure variations in said chamber for actuating said relay valve to govern the admission of high pressure steam to the one side of said first named valve.

5. In an exhaust steam injector of the type adapted to be operated by live steam when exhaust steam is not available, a conduit for supplying auxiliary steam to said injector, a steam pressure operated valve for controlling steam flow through said conduit, a steam pressure operated relay valve for controlling the admission of operating steam to said first named valve, and exhaust steam pressure controlled means for governing said relay valve, said means governing said relay valve by controlling the escape of a portion of the valve operating steam to a low pressure area.

6. In an exhaust steam injector of the type adapted to be operated by live steam when exhaust steam is not available, conduits for supplying exhaust steam and auxiliary steam to said injector, steam pressure operated valves for controlling steam flow through said conduits, a connection for admitting high pressure operating steam to said valves, a relay valve arranged to alternatively open said connection or close said connection and vent said first named valves to a low pressure area, and means governed by exhaust steam pressure for actuating said relay valve.

7. In an exhaust steam injector of the type adapted to be operated by live steam when exhaust steam is not available, a conduit for supplying auxiliary steam to said injector, a valve for controlling flow through said conduit, said valve being arranged to be opened by auxiliary steam flowing through said conduit and to be closed by high pressure steam acting in opposition to said auxiliary steam, means governed by exhaust steam pressure for controlling the admission of said high pressure steam to said valve, and resilient mechanical means for delaying the opening of said valve.

8. In an exhaust steam injector of the type adapted to be operated by live steam when exhaust steam is not available, a conduit for supplying auxiliary steam to said injector, a valve for controlling flow through said conduit, said valve being arranged to be opened by auxiliary steam flowing through said conduit and to be closed by high pressure steam acting in opposition to said auxiliary steam, means governed by exhaust steam pressure for controlling the admission of said high pressure steam to said valve and a spring for urging said valve toward closed position.

9. In an exhaust steam injector of the type adapted to be operated by live steam when exhaust steam is not available, a conduit for supplying auxiliary steam to said injector, steam pressure operated means for controlling flow through said conduit, a pressure chamber, means responsive to pressure variations in said chamber for controlling said first means, means for supplying steam to said pressure chamber, a conduit for venting said chamber to a low pressure area, a valve for controlling flow through said conduit, and a diaphragm adapted to be actuated by exhaust steam and arranged to operate said last named valve.

10. In an exhaust steam injector of the type adapted to be operated by live steam when exhaust steam is not available, a conduit for supplying auxiliary steam to said injector, a pressure-operated automatic valve, means for supplying operating steam to said valve, a relay valve for controlling said steam supply means, a pressure chamber, means responsive to pressure variations in said chamber for controlling said relay valve, means for supplying high pressure steam to said pressure chamber at a predetermined rate, a conduit for venting said chamber to a low pressure area, a valve for controlling flow through said conduit, and a diaphragm adapted to be actuated by exhaust steam and arranged to operate said last named valve.

11. In an exhaust steam injector of the type adapted to be operated by live steam when exhaust steam is not available, a conduit for supplying auxiliary steam to said injector, a pressure operated automatic valve, means for supplying operating steam to said valve, a relay valve for controlling said steam supply means, a pressure chamber, means responsive to pressure variations in said chamber for controlling said relay valve, means for admitting a restricted supply of high pressure steam to said pressure chamber, a conduit for venting said chamber to a low pressure area, a valve for controlling flow through said conduit and an exhaust steam pressure controlled diaphragm for actuating said last named valve.

12. In apparatus of the class described, the combination with an engine having a plurality of exhaust passages through which steam is emitted from the working chambers of the engine, of an exhaust steam injector operated by steam from said engine, means controlled by exhaust steam from said engine for governing the admission of a live steam supply to said injector, and means for supplying actuating steam to said governing means comprising a passage connecting at least two of said exhaust passages and arranged to cause a reversing steam flow through said connecting passage and means for transmitting substantially the average static pressure in said connecting passage to said governing means.

13. The combination with an engine provided with a plurality of exhaust steam passages through which exhaust steam is alternately emitted, of an exhaust steam injector, exhaust steam actuated means for governing the admission of auxiliary live steam to said injector, and means for supplying actuating exhaust steam to said governing means comprising a conduit forming a direct connection between said exhaust passages and a second conduit leading from said governing means and joining said first named conduit at substantially right-angles.

14. The combination with an engine provided with a plurality of exhaust steam passages through which exhaust steam is alternately emitted of an exhaust steam injector, exhaust steam actuated means for governing the admission of auxiliary live steam to said injector, and means comprising a bifurcated connection for establishing communication between two of said passages and said governing means.

15. In an exhaust steam injector of the class described, means for supplying water and supplementary steam continuously and auxiliary and exhaust steam in alternation to said injector, and means for insuring upon starting of the injector as an exhaust steam injector, the admission of both water and supplementary steam to the injector before the admission thereto of exhaust steam and for insuring, upon starting of the injector as a live steam injector, the admission of both water and supplementary steam to the injector before exhaust steam is admitted thereto.

16. In an exhaust steam injector of the class described, conduits for supplying water, exhaust steam and auxiliary steam to said injector, valves controlling each of said conduits, fluid pressure actuated means for opening each of said valves, connections from a common source of steam to each of said means, and springs for closing each of said valves, the springs acting on the valves controlling the exhaust and auxiliary steam conduits being of sufficient strength to delay their opening upon starting of the injector until after the water valve is opened.

17. In an exhaust steam injector of the class described, conduits for supplying water and auxiliary live steam to said injector, valves for controlling flow through said conduits, fluid pressure operated means for opening said valves, means for substantially simultaneously admitting steam from a common source to said first named means, and springs for closing each of said valves, the strength of the auxiliary valve spring being sufficient to delay the opening of the auxiliary steam valve upon starting of the injector until after the water valve is opened.

18. The combination with an exhaust steam injector having conduits connected therewith for supplying water, exhaust steam, supplementary live steam and auxiliary live steam to said injector, of an automatic valve for controlling the admission of live steam to the auxiliary live steam conduit, a connection from a source of live steam, said automatic valve being interposed between said connection and said auxiliary live steam conduit to be operated by the steam passing to said auxiliary live steam conduit, and means for delaying the opening of said valve, upon starting of the injector, until after the admission of water to the injector.

19. The combination with an exhaust steam injector having conduits connected therewith for supplying water, exhaust steam, supplementary live steam and auxiliary live steam to said injector, of an automatic valve for controlling the admission of live steam to the auxiliary live steam conduit, a connection from a source of live steam, said automatic valve being interposed between said connection and said auxiliary live steam conduit to be opened by the steam passing to said auxiliary live steam conduit, and a spring for urging said valve toward closed position to delay the opening of said valve, upon starting of the injector, until the resistance of said spring is overcome by steam pressure acting on said valve, the resistance of said spring being such as to delay opening of the valve until after the admission of water to the injector.

20. In a control system for an exhaust steam injector of the type adapted to be operated by live steam when exhaust steam is not available, a valve for controlling the admission of a live steam supply to the injector, a conduit providing a path for flow of pressure fluid from a zone of relatively high pressure to a zone of relatively low pressure and including a pressure chamber arranged for flow of said pressure fluid therethrough, means for admitting a restricted supply of pressure fluid to said chamber, means responsive to variations of pressure in said chamber for controlling the position of said valve, and means acting to effect closure of said valve to shift the injector from live steam operation comprising means for altering the rate of flow of pressure fluid through said chamber so as to change the value of the pressure therein.

21. In a control system for an exhaust steam injector of the type adapted to be operated by live steam when exhaust steam is not available, a valve for controlling the admission of a live steam supply to the injector, a conduit providing a path for flow of pressure fluid from a zone of relatively high pressure to a zone of relatively low pressure and including a pressure chamber, means for admitting a restricted supply of pressure fluid to said chamber, means responsive to a rise of pressure in said chamber to close said valve, and means acting to effect closure of said valve to shift the injector from live steam operation comprising a valve operable to cause increase in pressure in said chamber by restricting the rate of flow of pressure fluid therefrom to said zone of relatively low pressure.

22. In an exhaust steam injector control system, means providing a pressure chamber, means providing for constant restricted communication between said chamber and a source of high pressure steam when the injector is operating, means for venting said chamber, a valve actuated by pressure variations in said chamber for controlling the admission of a live steam supply to the injector, and valve means operable to control flow through said venting means whereby to cause pressure variations in said chamber.

23. In a control system for an exhaust steam injector of the type adapted to be operated by live steam when exhaust steam is not available, conduits for supplying exhaust steam and auxiliary live steam to said injector, fluid pressure actuated valves for controlling flow of steam through said conduits, and means associated with said valves for causing them to open and close in alternation to shift the injector from live steam operation to exhaust steam operation and vice versa, comprising a pressure chamber, the pressure in which determines the position of said valves, means placing said pressure chamber in constant restricted communication with a source of pressure fluid when the injector is operating, means for venting the chamber and valve means controlling flow through said venting means to effect variations of pressure in said chamber.

24. In a control system for an exhaust steam injector of the type adapted to be operated by live steam when exhaust steam is not available, conduits for supplying exhaust steam and auxiliary live steam to said injector, fluid pressure actuated valves for controlling flow of steam through said conduits, a connection for admitting high pressure operating steam to said valves, a relay valve arranged to alternatively open said connection or close said connection and vent the first named valves to a zone of low pressure, and means for causing the injector to shift from live steam operation to exhaust steam operation and vice versa, comprising means for actuating said relay valve.

25. In a control system for an exhaust steam injector of the type adapted to be operated by live steam when exhaust steam is not available, a conduit in constant communication with a source of pressure fluid when the injector is operating for creating a restricted flow of said pressure fluid, means for altering the rate of flow of said pressure fluid to cause variations in pressure in said conduit, and means responsive to variations of pressure in said conduit for admitting auxiliary live steam to the injector when exhaust steam is not available and for shutting off the supply of auxiliary live steam when exhaust steam is available.

MALCOLM HARD.